United States Patent
Girard et al.

(10) Patent No.: US 8,650,412 B2
(45) Date of Patent: Feb. 11, 2014

(54) METHOD FOR MANAGING THE EXECUTION OF A SOFTWARE ARCHITECTURE OF A RADIOCOMMUNICATION CIRCUIT WITH CONSTANT PROCESSOR FREQUENCY, CORRESPONDING COMPUTER PROGRAM PRODUCT AND CIRCUIT

(75) Inventors: Erwan Girard, Igny (FR); Jacques Montes, Le Perreux sur Marne (FR)

(73) Assignee: Sierra Wireless, Issy-les-Moulineaux Cedex (FR)

( * ) Notice: Subject to any disclaimer, the term of this patent is extended or adjusted under 35 U.S.C. 154(b) by 767 days.

(21) Appl. No.: 12/669,555

(22) PCT Filed: Jul. 16, 2008
(Under 37 CFR 1.47)

(86) PCT No.: PCT/EP2008/059314
§ 371 (c)(1),
(2), (4) Date: Nov. 5, 2010

(87) PCT Pub. No.: WO2009/010535
PCT Pub. Date: Jan. 22, 2009

(65) Prior Publication Data
US 2012/0042191 A1   Feb. 16, 2012

(30) Foreign Application Priority Data
Jul. 18, 2007   (FR) ...................................... 07 56590

(51) Int. Cl.
*G06F 1/26* (2006.01)

(52) U.S. Cl.
USPC ............................. 713/300; 370/311; 718/104

(58) Field of Classification Search
USPC ............................. 370/311; 713/300; 718/104
See application file for complete search history.

(56) References Cited

U.S. PATENT DOCUMENTS

| 5,794,036 A | 8/1998 | Gomi et al. |
| 6,092,095 A | 7/2000 | Maytal |

(Continued)

FOREIGN PATENT DOCUMENTS

WO   0062157 A2   10/2000

OTHER PUBLICATIONS

Steere D. C. et al: "A Feedback-Driven Proportion Allocator for Real-Rate Scheduling", USENIX Association Proceedings of the 3rd Symposium on Operating Systems Design and Implementation. OSDI 1999 (published in: Operationg Systems Review, OSR Special Issue—Winter 1998), New Orleans, LA, Feb. 22-25, 1999, Symposium on Operating Systems, Feb. 22, 1999, pp. 145-458, XP002153159.

(Continued)

*Primary Examiner* — Albert Wang
(74) *Attorney, Agent, or Firm* — David D. Brush; Westman, Champlin & Koehler, P.A.

(57) ABSTRACT

A method for managing execution by a processor of a software architecture included in a radiocommunication circuit is provided. The software architecture includes a radiocommunication software stack and at least one client application. The has the following steps, for a given frequency of the processor: a) obtaining a first computing power associated with the stack; b) obtaining a second computing power associated with the at least one client application; c) computing the sum of the first and second computing powers; d) comparing the sum with a predetermined threshold; e) detecting, based on the result of the comparison step, that the second computing power is insufficient for the processor to execute the at least one client application; and f) in the case of positive detection, restraining at least one functionality of the stack.

14 Claims, 2 Drawing Sheets

(56) References Cited

U.S. PATENT DOCUMENTS 6,385,638 B1  5/2002  Baker-Harvey
2006/0168261 A1* 7/2006 Serval et al. .................. 709/230

OTHER PUBLICATIONS

Buttazzo, Giorgio C.: "Hard Real-Time Computing Systems: Predictable Scheduling Algorithms and Applications (2nd Edition)", Oct. 1, 2004, Springer, Real Time Systems Series, vol. 23, XP002475695 ISBN: 978-0-387-23137-2 Chapter 8—"Handling Overload Conditions" p. 233-279.

International Search Report dated Nov. 27, 2008 for corresponding International Application No. PCT/EP2008/059314 filed on Jul. 16, 2008.

French Search Report, dated Apr. 15, 2008 for corresponding French Application No. 07/56590 filed on Jul. 18, 2007.

English Translation of the International Preliminary Report on Patentability, dated Feb. 9, 2010 for corresponding International Application No. PCT/EP2008/059314 filed on Jul. 16, 2008.

\* cited by examiner

METHOD FOR MANAGING THE EXECUTION OF A SOFTWARE ARCHITECTURE OF A RADIOCOMMUNICATION CIRCUIT WITH CONSTANT PROCESSOR FREQUENCY, CORRESPONDING COMPUTER PROGRAM PRODUCT AND CIRCUIT

CROSS-REFERENCE TO RELATED APPLICATIONS

This Application is a Section 371 National Stage Application of International Application No. PCT/EP2008/059314, filed Jul. 16, 2008 and published as WO 2009/010535 on Jan. 22, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunication devices.

By radiocommunication devices (also called radiocommunication terminals or wireless terminals), is meant all devices or means that are capable of exchanging signals using a radiocommunication system, implanted for example in machines or vehicles (M2M market, for "Machine to Machine", and automobile).

The field of application of the disclosure covers all cellular (GSM, 3G, 4G, DECT, CDMA, Wi-Max, etc.) or point-point (Wifi, Bluetooth, Zigbee, etc.) radiocommunication technology.

More precisely, the disclosure relates to a technique for managing the execution by a processor of a software architecture included in a radiocommunication circuit, in the case where this software architecture comprises a radiocommunication software stack supporting the ability of executing at least one client application, i.e. third-party code in comparison with the code of the main radiocommunication application (firmware) which is also executed by the processor and manages the radiocommunication software stack (GSM stack for example).

The disclosure applies in particular, but not exclusively, in the case where the radiocommunication circuit is an electronic radiocommunication module intended to be incorporated into a radiocommunication device. This entails for example a module of the "WMP", "Quick" or "Plug and Play" (registered trademarks) family of the WAVECOM company (applicant for this patent application). The WAVECOM company has indeed for several years proposed an approach that overcomes a certain number of disadvantages by grouping together in a single module (called electronic radiocommunication module), all or at least most of the functions of a digital radiocommunication device. Such a module has the form of a single case, preferably shielded, that the manufacturers of devices can implant directly, without having to take into account a multitude of components. This module (sometimes still called "macro component") is indeed formed of a regrouping of several components on a substrate, in such a way as to be implanted in the form of a single element. It comprises the main components (in particular a processor, memories, and software) that are required for the operation of a radiocommunication device using radio frequencies. Therefore, there are no longer any complex steps in the designing and in the validation of the latter. It is enough to reserve the place required for the module. Such a module can therefore make it possible to integrate easily, rapidly and in an optimized manner all of the components in wireless terminals (portable telephones, modems, or any other device making use of a wireless standard).

In an alternative application of the disclosure, the radiocommunication circuit is not a radiocommunication module in the aforementioned sense but a printed circuit contained in a radiocommunication device and whereon are directly implanted a set of electronic components having for purpose to provide the various required radiocommunication functions, from the receiving of an RF signal until the generation of an audible signal (in the case of a wireless telephone), and inversely.

BACKGROUND OF THE DISCLOSURE

Radiocommunication circuits making it possible to embark client applications are known in prior art.

The radiocommunication circuit is for example an electronic radiocommunication module of the "WISMO" (registered trademark) family implementing the "Open AT" (registered trademark) concept of the WAVECOM company (applicant for this patent application), offering an environment for executing at least one onboard client application. It is clear that other environments for executing an onboard client application can be used, such as Java (registered trademark) or Python (registered trademark).

One of the problems of modules that provide abilities to embark the applications of their clients is that no guarantee on the available computing power is provided to the client in an optimized way.

Indeed, the function (software stack) for radiocommunication (GSM or CDMA cellular telephony for example) requires, according to its state, a very different computing power. The computing power of the platform (whereon the radiocommunication stack and the client application are executing) being finite at a given frequency, and the client application having a priority that is less than that of the stack, this client application will have only the remaining portion of computing power in order to execute. This can cause problems when the client application has calculations to perform and/or operations to carry out within a given period of time in order to not lose information (in particular when the latter is relayed in real time).

For example, when the client application is acquiring values in real time (for example every 10 milliseconds), it must process them (for example, calculate an average, a standard deviation, etc.) and store them in non-volatile memory in order to not lose them. To do this, it must carry out this processing with a given period of time (in our example, less than 10 milliseconds) otherwise after a certain period of time there will no longer be enough memory to store the raw values (before calculation), and some will be lost, which could be highly problematic and jeopardize the system as a whole.

The difficulty is that the GSM stack needs a computing power that varies according to the different states that it may have:

off (disconnected): the module is not connected to the GSM/GPRS network and as such cannot communicate;

searching for network: the module has lost the synchronization with the network (start-up/out of coverage, etc.) but is looking for a network whereon it can synchronize;

at rest (idle): the module is connected to the GSM/GPRS network. It is therefore able to receive, place calls, send/receive SMSs, initiate a GPRS connection but it is not making use of any of these possibilities;

a voice call;

a data call;

in data transfer (GPRS, EDGE, 3G, HSDPA, HSUPA, etc.);

in sending/receiving short messages (SMS);

in sending/receiving of supplementary service data (USSD).

However, the onboard systems have in general at least one operating mode by battery and must therefore finely manage their consumption in terms of current. As such, overdimensioning the computing power of an onboard system comprising a GSM stack as a solution for overcoming the computing power peaks consumed by the GSM stack is not a viable solution for an autonomous onboard system since it results in a substantial overcost for the overall solution (the notion of optimal computing power is therefore primordial during the designing of an onboard system in order to not generate redhibitory overcosts).

The most important point is that it is impossible for the client application to know before the phase the needs in terms of power for the protocol stack.

For example, when searching for a network, there is no way for the client application to predict the moment when the system is going to find it and as such the load of the computing power required for the synchronization with the cellular network and consequently the computing power that will be lacking when this synchronization takes place, nor even the moment when this computing power will be lacking.

Likewise, the loss of synchronization network (for example when the GSM cells are too far away to be detected by the onboard system) results in a request for additional computing power from the protocol stack and could therefore impact the available computing power for the client application during the network resynchronization, with the dangers that this includes in terms of loss of data if this data is not processed rapidly enough.

As such, in an onboard system comprising a GSM/GPRS stack, most of the events processed by the stack and which impact the computing power left free to the client application cannot be predicted by the client application, and can as such impact the proper operation of the system as a whole.

In sum, the execution of a radiocommunication stack (for example a GSM/GPRS stack) requires considerable computing power that varies according to the states of this stack, with the risk of losing the synchronization with the network (and therefore to no longer be able to make/receive calls, send/receive SMSs, USSD, etc.).

According to a first known technique, not knowing what impact the execution of the client applications will have on the proper operation of their own radiocommunication stack (GSM/GPRS stack for example), and therefore on the proper global operation of their product, the manufacturers of radiocommunication modules (in particular intended for the M2M and automobile markets) do not provide their clients with the ability to guarantee a defined and optimized value of computing power regardless of the state of the radiocommunication stack.

Therefore at a computing power (also called CPU power) that is constant (i.e. at a clock frequency of the processor that is constant) the CPU power allocated to the client application depends on the activity of the radiocommunication stack. This can cause a problem when the client application requests more computing power than is allocated to it. At best, the client application will be slower. At worst, it will no longer operate. In both cases, when the situation occurs in the field, the consequences of this can be extremely damaging/substantial/costly.

For example, at 104 MHz, a standard platform provides 104 MIPS of CPU power. If we assume for example that the GSM stack/GPRS needs during a GPRS transfer (requested by the client application) 32 MIPS in order to execute, the client application can then take advantage of the remaining 72 MIPS. But if the application needs 85 MIPS to execute normally, it will be missing 13 MIPS. This situation can result in a malfunction or the stoppage of the operation of the client application.

According to a second known technique, the suppliers of radiocommunication stack (GSM stack/GPRS for example) provide a code which, compiled and executed on an associated platform, makes it possible to make/receive calls, etc. These suppliers of software solutions as such allows their clients to execute code at all levels, code which could therefore benefit from a defined and optimized computing power regardless of the state of the radiocommunication stack. But in no way do they guarantee as such that the radiocommunication stack will operate correctly. Furthermore, this involves much complexity in the designing of the client application and therefore a substantial expertise in the field of radiocommunications (GSM/GPRS for example).

For these reasons, this second alternative technique is difficult to be used, in particular by the clients in the M2M markets and all the more so by any person who is not an expert in the final application field of the global product as well as in the field of telecommunications, in particular GSM/GPRS technologies.

Therefore, most software architectures that allow external code to be embarked on a radiocommunication platform (wireless platform) are compliant with the first known technique (guarantee of the proper operation of the GSM/GPRS stack, but no guarantee as to the computing power supplied to the client application.

SUMMARY

In a particular embodiment of the invention, a method for managing the execution by a processor of a software architecture comprised in a radiocommunication circuit is proposed, said software architecture comprising a radiocommunication software stack and at least one client application. This method comprises the following steps, for a given frequency of said processor:

a) obtaining a first computing power associated to said stack;

b) obtaining a second computing power associated to said at least one client application;

c) calculating the sum of said first and second computing powers;

d) comparing said sum with a predetermined threshold;

e) detecting using the result of said step of comparing that said second computing power is insufficient for said processor to execute said at least one client application;

f) in the event of positive detection, restraining of at least one functionality of said stack.

The general principle of this particular embodiment consists therefore in automatically restraining (i.e. limiting) certain functionalities of the radiocommunication stack in order to be able to release the power of the processor (CPU power)

which can be allocated to said at least one client application. As such, the computing power supplied to said at least one client application is optimized, and the development by the client of his application(s) is facilitated, since the latter can be less complex as they are less or not at all dependent on the state of the radiocommunication stack.

Advantageously: 80%*M≤S≤100%*M, with S said threshold and M the computing power of the processor at said given frequency of said processor.

Advantageously, the first computing power associated to the stack is a power taken or requested by the stack, and the second computing power associated to said at least one client application is a power taken or requested by said at least one client application.

By computing power requested by an entity (stack or client application), is meant the computing power that this entity wants to have reserved for itself. Computing power taken by an entity means the computing power actually used by this entity. For a given entity and at a given instant, the computing power requested and the computing power taken by this entity can therefore be different. For example, the client application can request a computing power of 85 MIPS during a given range of time, but only take a power of 80 MIPS at a given instant in this time range.

Taking into account only the computing power taken makes it possible to obtain finer management of the processor time and therefore to optimize the restraining (any unnecessary restraining of certain functionality or functionalities of the stack is avoided).

Taking only the requested computing power into account makes it possible to simplify the management of processor time, but the optimization of the restraining is less than in the preceding case.

Advantageously, said method comprises a step of defining at least two levels of restraining, and in that said steps a), b), c), d), e) and f) are performed iteratively until said sum of said first and second computing powers is less than said threshold, each iteration being associated to a level of restraining that is less than the level of restraining associated to the preceding iteration.

By proceeding by iteration, the restraining is optimized. The higher the number of levels of restraining is, the finer the granularity of the restraining is.

Advantageously, the method comprises a step of defining a maximum level of restraining. According to an embodiment of the invention, each level of restraining associated to an iteration is less than or equal to said maximum level of restraining.

This maximum level of restraining can be defined by the client. The computing power able to be guaranteed to the client application is all the more so higher that the client accepts substantial restraining of the radiocommunication stack.

According to an advantageous characteristic, said method comprises a step of dynamic modification, by said at least one client application, of said determined maximum level of restraining.

Advantageously, said software architecture comprises a master client application and at least one secondary client application, and said step of dynamic modification comprises the following steps, for a current level of restraining:
  receiving, from one of said client applications, of a modification request of said current level of restraining;
  detecting that said modification request is coming from said master client application;
  modifying of said current level of restraining by said master client application.

As such, the master client application can at any time, for its own needs, change the configuration of the restraining (i.e. degradations in the capacities for calculation accepted for the radiocommunication stack), the secondary client applications being dependent on the decisions taken by the master client application.

Advantageously, the restraining of a given functionality of said stack consists in performing an action belonging to the group comprising:
  limiting of at least one parameter of said given functionality;
  postponing an execution of said given functionality; and
  cancelling an execution of said given functionality.

Advantageously, said step of restraining comprises at least one action of restraining belong to the group comprising:
  limiting the number of data sending and receiving modes that can be used;
  reducing the rate of at least one of the data sending and receiving modes that can be used;
  postponing the sending of at least one message;
  not responding to at least one incoming call;
  limiting at least one of the functionalities of said stack linked to the signaling, to the recording on the network and to the management of the mobility, with a zero or reduced data rate.

This is not a complete list.

According to an advantageous characteristic, said software architecture comprises an application for managing at least one peripheral device, and said step of restraining of at least one functionality of the stack is supplemented or at least partially replaced by a step of restraining of at least one functionality of said application for managing of at least one peripheral device.

It is considered in this case that the managing of peripheral devices is not linked to the managing of the radiocommunication stack properly speaking.

Advantageously, said circuit is an electronic radiocommunication module intended to be incorporated into a radiocommunication device.

Advantageously, said method is implemented in a main application which, when it is executed by said processor, manages said radiocommunication software stack and offers an environment for the executing of said at least one client application.

In another embodiment, the invention relates to a computer program product which can be downloaded from a communication network and/or recorded on a medium that can be read by a computer and/or which can be executed by a processor, said computer program product comprising program code instructions for the execution of the steps of the aforementioned method, when said program is executed on a computer.

In another embodiment, the invention relates to a radiocommunication circuit, comprising a processor executing a software architecture comprising a radiocommunication software stack and at least one client application. This circuit comprises:
  means of obtaining a first computing power associated to said stack;
  means of obtaining a second computing power associated to said at least one client application;
  means of computing the sum of said first and second computing powers;
  means of comparing the sum of said first and second computing powers with a predetermined threshold;

means of detecting that said second computing power is insufficient for said processor to execute said at least one client application;

means of restraining of at least one functionality of said stack.

More generally, the radiocommunication circuit according to an embodiment of the invention comprises means for implementing the method such as described hereinabove (in any of its different embodiments).

BRIEF DESCRIPTION OF THE DRAWINGS

Other characteristics and advantages of embodiments of the invention shall appear when reading the following description, provided as an indication and in a non-restrictive manner (all of the embodiments of the invention are not limited to the characteristics of the embodiments described hereinafter), and the annexed drawings, wherein.

DETAILED DESCRIPTION OF ILLUSTRATIVE EMBODIMENTS

Figure 1:
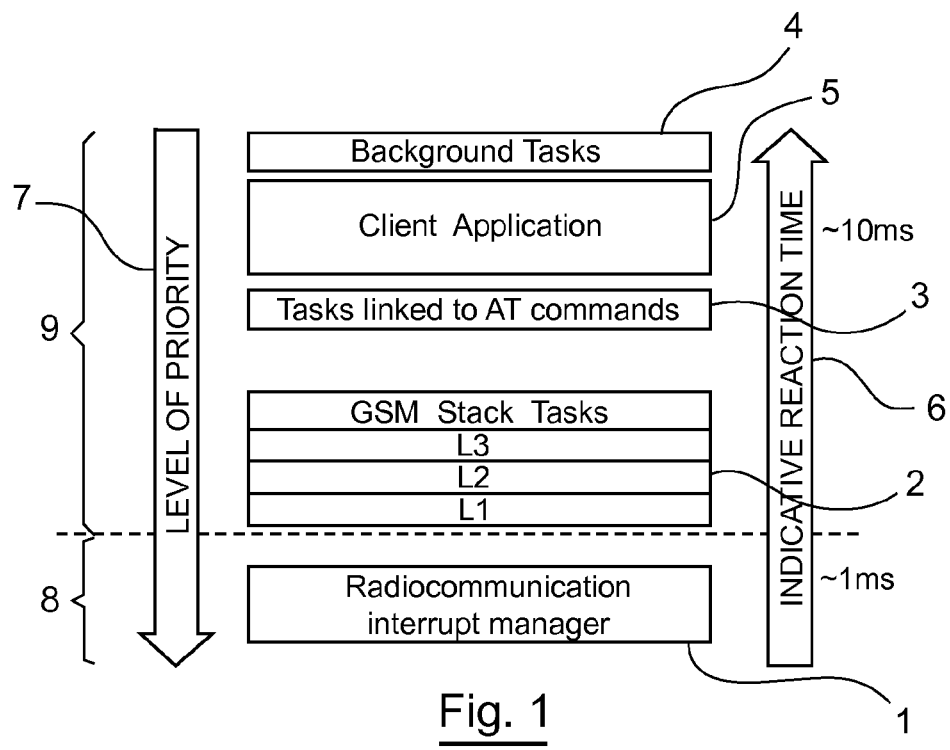
FIG. 1 shows a known software architecture, of a GSM stack supporting the capacity of executing at least one client application.

In relation with FIG. 1, a known software architecture is now shown, of a GSM stack supporting the capacity for executing a client application.

This software architecture typically comprises a radiocommunication software stack (in the example in FIG. 1, a GSM stack) comprising:

a radiocommunication interrupt manager 1 ("GSM Stack IT Handler"), which provides physical link services and provides the synchronization with the GSM network. It corresponds to the GSM physical layer;

a set of tasks 2 specific to the GSM stack ("GSM Stack Tasks L1-L3"), distributed into layers (L1 to L3), and which provides a logical link and control service. In the GSM standard, it corresponds to L1/L2/L3, RR/LAPD/MM/CCRLC/MAC/LLC/SNDCP/SM;

a set of tasks 3 linked to AT commands ("GSM AT Commands Task"), which provide a GSM stack control service. In the GSM standard, it corresponds to the Application layer; and a task 4 called "Idle Task" or "Background task" which is executed when no other task is requesting the CPU resources.

This software architecture further comprises at least one client application 5 (in this example a single "Open AT" application), comprising a set of client tasks. Within the GSM stack, this client application 5 is positioned between the set of tasks 3 linked to AT commands and the background task 4. The arrow referenced as 6 indicates an axis of indicative reaction time (from approximately 1 ms to approximately 10 ms). The arrow referenced as 7 indicates an axis of priority level (from the background task 4, which has the least priority, to the radiocommunication interrupt manager 1, which has the highest priority).

This software architecture can also be broken down into two domains:

a domain 8 for managing interrupts, wherein is included the radiocommunication interrupt manager 1; and a domain 9 for managing tasks, wherein are included all of the aforementioned tasks (tasks 2 specific to the GSM stack, tasks 3 linked to AT commands, background task 4 and tasks of the client application 5).

As such, with this known structure, any client application can be executed by the radiocommunication module while still guaranteeing the proper operation of the GPRS/GSM stack. Nevertheless, no guarantee on the optimized computing power supplied to the client application is provided.

In the example shown in FIG. 1, the software architecture comprises a single client application 5. It is clear however that those skilled in the art can easily transpose this example in the case where the software architecture comprises a GSM stack and several applications client (each client application comprising a set of client tasks and being positioned, within the GSM stack, between the set of tasks 3 linked to AT commands and the background task 4).

Figure 2:
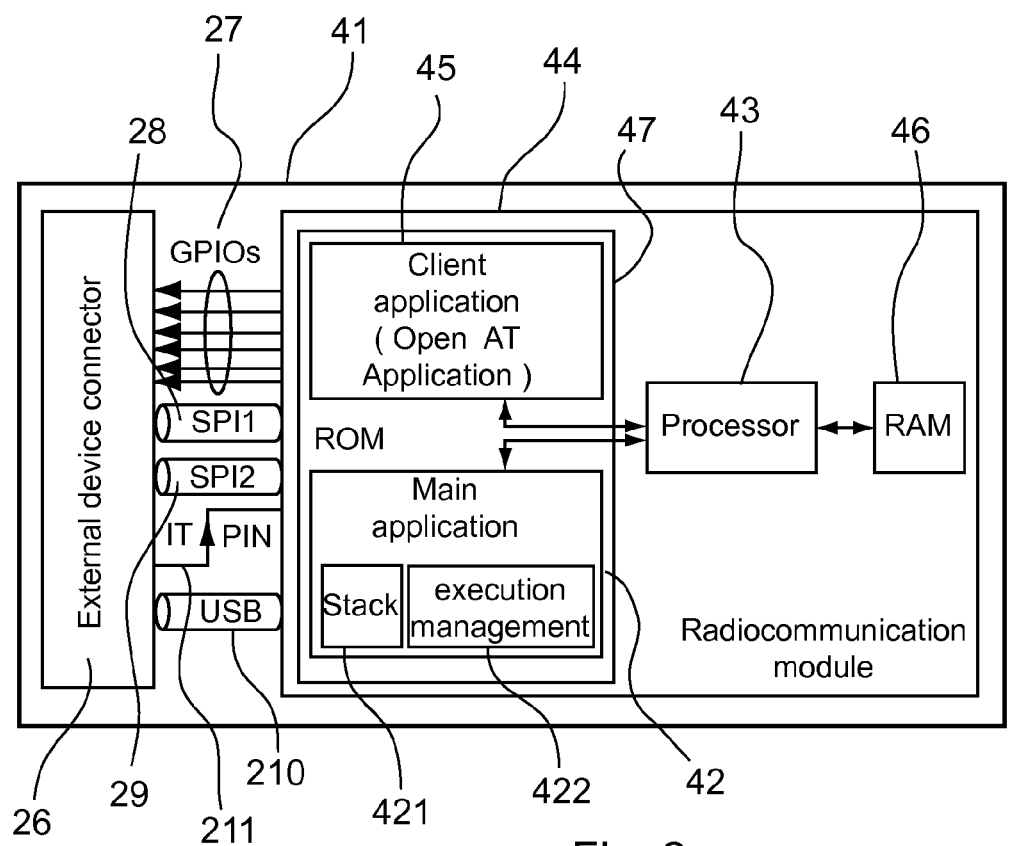
FIG. 2 shows a particular embodiment of a device for radiocommunication, comprising a radiocommunication module having a software architecture according to FIG. 1.

In relation with FIG. 2, a particular embodiment of a device for radiocommunication according to an embodiment of the invention is now presented.

It comprises a motherboard 41 whereon is implanted a radiocommunication module 44 having a software architecture according to the FIG. 1, obtained by execution by a processor 43 (and a RAM memory 46) of:

a main radiocommunication application 42 comprising a software block 421 which handles the radiocommunication software stack (GSM stack for example) and a software block 422 which makes it possible to implement the method of an embodiment of the invention (making it possible to manage the execution of the software architecture by the processor); and a client application 45.

It is important to note that the method according to an embodiment of the invention, which is embarked in the radiocommunication module 44, does not disturb in any way the radiocommunication network (cellular network). Its implementation remains compliant from a network standpoint with ETSI/3GPP recommendations.

The main radiocommunication application 42 and the client application 45 are for example stored in a read-only memory 47 (ROM for example) and, at the initialization of the radiocommunication module 44, the code instructions of these applications are loaded into a random-access memory 46 (RAM for example) before being executed by the processor 43.

Moreover, the radiocommunication module 44 is connected to a connector 26 for external devices, via general purpose Input/Output interfaces (GPIOs) 27, serial interfaces of the SPI type (Serial Peripheral Interface) (SPI1, SPI2) 28 and 29, a USB interface 210 and a link carrying interruptions (IT) 211.

Figure 3:
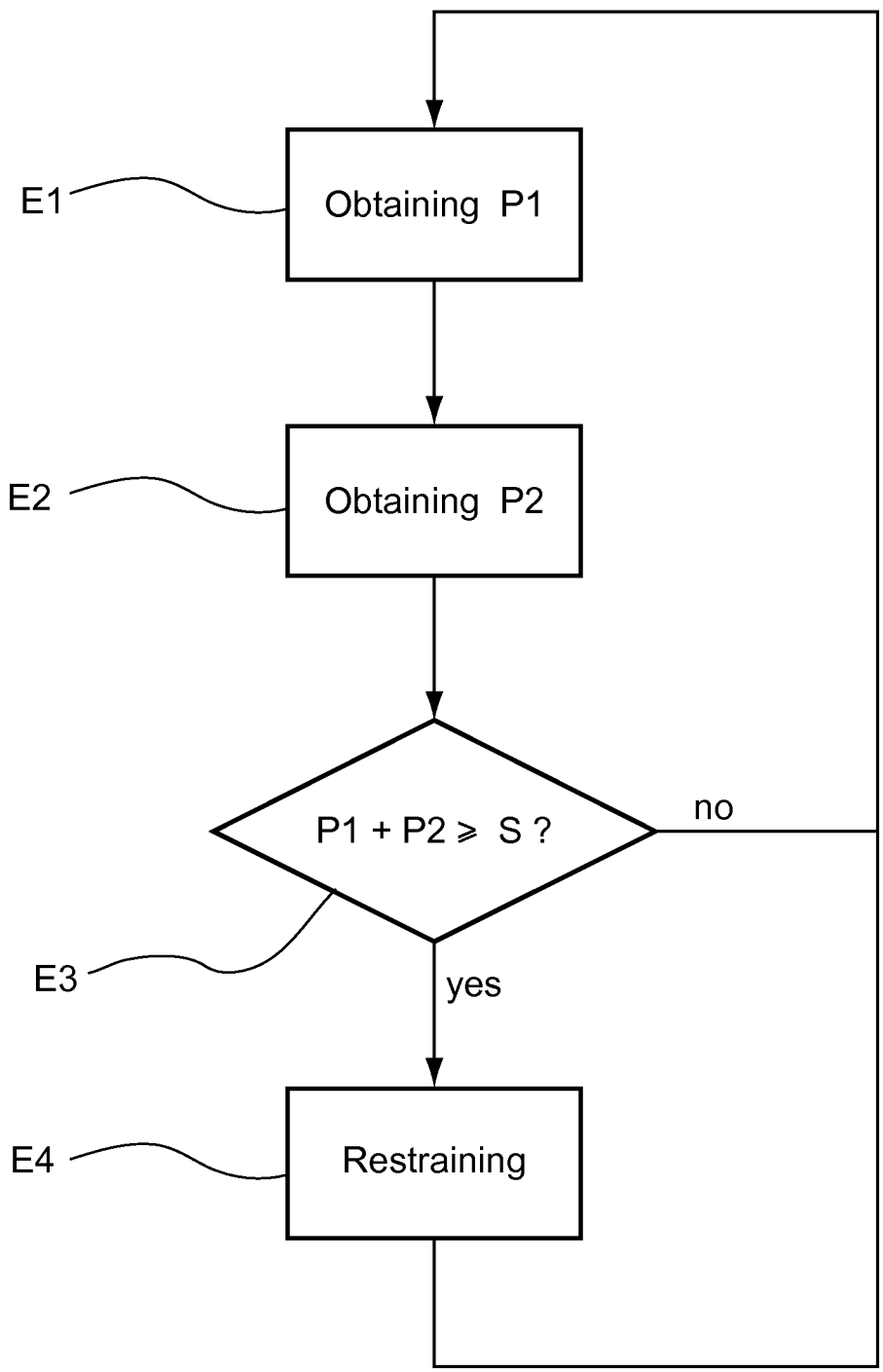
FIG. 3 shows a flow chart of a particular embodiment of the method.

In relation with FIG. 3, a particular embodiment of the method is now shown.

In a step E1, a first computing power P1 is obtained associated to the stack 421, and in a step E2, a second computing power P2 is obtained associated to the client application 45.

The first and second computing powers P1 and P2 are either those requested by the stack and the client application, or those actually taken by the latter. They are for example obtained thanks to the operating system (OS) which handles the processor time (also called CPU time). The techniques of obtaining such information about computing power, thanks to an operating system, are well-known to those skilled in the art and therefore do not require any detailed explanation.

In a step E3, it is detected whether or not the sum of the first and second computing powers (P1+P2) is greater than or equal to a predetermined threshold S. This threshold is for example such that: 80%*M≤S≤100%*M, with M being the computing power of the processor at the frequency of the processor in question.

The steps E1 to E3 are for example carried out at predetermined instants (for example according to a cycle of predetermined periods) and/or at instants when predetermined events occur, such as for example:
- when the stack is getting ready to switch to a new state that requires greater computing power than that used in the current state,
- when the computing power requested by the client application is modified,
- when the configuration for the restraining has been modified,
- etc.

In the event of positive detection in the step E3, control passes to the step E4, during which is carried out a restraining of at least one functionality of the stack (this is more preferably on functionalities that have considerable requests for CPU power), in order to release computing power for the client application. At the end of the step E4, control passes back to the step E1. In the event of a negative detection in step E3, control passes directly back to the step E1.

Optionally, several levels of restraining are defined. The steps E1, E2, E3 and E4 are performed iteratively, as long as the stop criterion "P1+P2<S" is not verified. At each execution of the step E4, the current level of restraining switches to a new level of restraining, that is higher, up to the limit of a determined maximum level of restraining.

In a particular embodiment, this determined maximum level of restraining can be modified dynamically by the client application.

An additional mechanism for restraining can be provided. For example, at the end of the step E4, steps identical to the steps E1 and E2 are carried out, then a step of comparing of the type: "P1+P2<S'?", with S' a threshold which can be equal to the aforementioned threshold S (case of a simple comparison) or less than the latter (case of a hysteresis comparison). If the relation "P1+P2<S'" is verified, then control passes to a step of releasing (the limitation introduced beforehand is suppressed, during the step E4 of restraining of at least one functionality of the stack).

The notion of restraining the functionalities of the stack shall now be discussed in more detail. The step E4 of restraining comprises at least one of the following restraining actions:
- Limiting the use of data sending and receiving modes:
  - Limitation to the SMS mode;
  - Limitation to the voice mode;
  - Limitation to the GSM CSD data mode;
  - Limitation to the GPRS data mode;
  - Limitation to the EDGE data mode;
  - Limitation to the UMTS mode;
  - Limitation to the HSXPA mode (in particular HSDPA and HSUPA);
- Reducing rates:
  - GPRS rate reduced by restraining the GPRS class;
  - EDGE rate reduced by restraining the EDGE class and the modulation coding scheme (MCS);
  - UMTS rate reduced by restraining the quality of service "QoS";
  - HSxPA rate (in particular HSDPA and HSUPA) reduced by restraining the "category class" parameter;
- Sending of SMS deferred to a later date with possibility of defining a maximum delay;
- Not responding to an incoming call:
  - Either by not responding to the personal search signal (paging);
  - Or by establishing the signaling channel and by rejecting the call with the cause "busy";
- Limiting the functionalities of the radiocommunication stack linked to the signaling, to the recording on the network and to the management of mobility (L3RR, L3MM, L3CC, L3SMS, Layer 1, Hardware Layer), with a zero or reduced data rate.

It is clear that many other embodiments of the invention can be considered.

It can in particular be provided that the software architecture comprises a radiocommunication software stack and several client applications (multi-application environment): a master client application and one or several secondary client applications cohabitate on the same platform.

In this case, in the step E3, for example the second computing power P2 is the sum of the computing powers requested (or taken) by all of the client applications (master and secondary).

Also in this case, it is for example the master client application that decides the maximum restraining that is accepted (i.e. which configures the degradations in capacities accepted for the radiocommunication stack). The secondary client applications depend on this configuration while the master client application can at any time, for its own needs, override this configuration and request another configuration of the stack (for example in order to have priority over a communication that requires more CPU power).

Solely for the purposes of information, here are the successive steps in an example of restraining the capacity of the functionalities in such a multi-application environment:
- the master client application reserves 95 MIPS (P2) out of the maximum of 104 MIPS offered by the processor at a frequency of 104 MHz. It is assumed moreover that the computing power requested by the stack (P1) is greater than 9 MIPS;
- the method according to an embodiment of the invention deduces from this that a restraining of the stack is required (for example, a limitation of the data sending modes when sending an SMS);
- if a secondary client application requests a GPRS connection, this connection is refused, with a cause "CPU limitation";
- the master client application, if it desires to request a GPRS connection, dynamically modifies the restraining for this purpose (it is another functionality in the stack that will be restrained), and as such the GPRS connection is granted to it.

In another embodiment of the invention, it can also be provided to restrain (i.e. limit) aspects of management of physical peripheral devices (not linked to the radiocommunication stack properly speaking). In this case, it is assumed that the software architecture further comprises an application for managing at least one peripheral device, and the step of restraining of at least one functionality of the stack is supplemented or at least partially replaced by a step of restraining of at least one functionality of this application for managing at least one peripheral device. This makes it possible for example to limit the use of a USB driver in certain cases, either by prohibiting its operation or by restraining the maximum speed for data exchange.

An aspect of the disclosure relates to a technique for managing the execution by a processor of a software architecture included in a radiocommunication circuit, in the case where this software architecture comprises a radiocommunication software stack and at least one client application, this technique making it possible, for a given frequency of the processor, to guarantee a certain computing power to said at least one client application, regardless of the activity of the radiocommunication software stack.

By guaranteeing a certain computing power to said at least one client application, the client has less, even no, worry concerning the state of the radiocommunication stack in order to design and define his application (i.e. develop the source code for this application). If the restraining of the stack is sufficient regardless of the state of the stack, the client can even define his application in the same way, whether it is intended to be executed on a processor in a circuit without a radiocommunication software stack or on a processor that is a little more powerful of a circuit (of radiocommunication) comprising a radiocommunication stack natively.

At least one embodiment of the disclosure provides such a technique that is simple to implement and inexpensive.

Although the present disclosure has been described with reference to one or more examples, workers skilled in the art will recognize that changes may be made in form and detail without departing from the scope of the disclosure and/or the appended claims.

The invention claimed is:

1. A method for managing execution by a processor of a software architecture comprised in a radiocommunication circuit, said software architecture comprising a radiocommunication software stack and at least one client application, wherein the method comprises the following steps, for a given frequency of said processor:
   a) obtaining a first computing power associated to said stack;
   b) obtaining a second computing power associated to said at least one client application;
   c) calculating the sum of said first and second computing powers;
   d) comparing said sum with a predetermined threshold;
   e) detecting using the result of said step of comparing that said second computing power is insufficient for said processor to execute said at least one client application; and
   f) in the event of positive detection, restraining of at least one functionality of said stack.

2. The method according to claim 1, wherein: $80\%*M \leq S \leq 100\%*M$, wherein S is said threshold and M is the computing power of the processor at said given frequency of said processor.

3. The method according to claim 1, wherein the first computing power associated to the stack is a power taken or requested by the stack, and the second computing power associated to said at least one client application is a power taken or requested by said at least one client application.

4. The method according to claim 1, wherein the method comprises a step of defining of at least two levels of restraining, and said steps a), b), c), d), e) and f) are performed iteratively until said sum of said first and second computing powers is lower than said threshold, each iteration being associated to a level of restraining that is lower than the level of restraining associated to the preceding iteration.

5. The method according to claim 4, wherein the method comprises a step of defining a maximum level of restraining, and each level of restraining associated to an iteration is lower than or equal to said maximum level of restraining.

6. The method according to claim 5, wherein the method comprises a step of dynamic modification, by said at least one client application, of said determined maximum level of restraining.

7. The method according to claim 6, wherein said software architecture comprises a master client application and at least one secondary client application, and wherein said step of dynamic modification comprises the following steps, for a current level of restraining:
   receiving, from one of said client applications, of a modification request of said current level of restraining;
   detecting that said modification request is coming from said master client application;
   modifying of said current level of restraining by said master client application.

8. The method according to claim 1, wherein the restraining of a given functionality of said stack comprises performing an action belonging to the group comprising:
   limiting of at least one parameter of said given functionality;
   postponing an execution of said given functionality; and
   cancelling an execution of said given functionality.

9. The method according to claim 1, wherein said step of restraining comprises at least one action of restraining belonging to the group comprising:
   limiting the number of data sending and receiving modes that can be used;
   reducing the rate of at least one of the data sending and receiving modes that can be used;
   postponing the sending of at least one message;
   not responding to at least one incoming call;
   limiting at least one of the functionalities of said stack linked to the signaling, to the recording on the network and to the management of the mobility, with a zero or reduced data rate.

10. The method according to claim 1, wherein said software architecture comprises an application for managing at least one peripheral device, and wherein said step of restraining of at least one functionality of the stack is supplemented or at least partially replaced by a step of restraining of at least one functionality of said application for managing at least one peripheral device.

11. The method according to claim 1, wherein said circuit is an electronic radiocommunication module intended to be incorporated into a radiocommunication device.

12. The method according to claim 1, wherein the method is implemented in a main application which, when executed by said processor, manages said radiocommunication software stack and offers an environment for the executing of said at least one client application.

13. A non-transitory computer-readable medium comprising a computer program product recorded thereon that can be read by a computer and/or which can be executed by a processor, wherein the product comprises program code instructions for execution a method for managing execution by a processor of a software architecture comprised in a radiocommunication circuit, when said program is executed on a computer, wherein said software architecture comprises a radiocommunication software stack and at least one client application and wherein the method comprises the following steps, for a given frequency of said processor:
   a) obtaining a first computing power associated to said stack;
   b) obtaining a second computing power associated to said at least one client application;
   c) calculating the sum of said first and second computing powers;

d) comparing said sum with a predetermined threshold;
e) detecting using the result of said step of comparing that said second computing power is insufficient for said processor to execute said at least one client application; and
f) in the event of positive detection, restraining of at least one functionality of said stack.

14. A radiocommunication circuit, comprising a processor executing a software architecture comprising a radiocommunication software stack and at least one client application, wherein the circuit comprises:
   means of obtaining a first computing power associated to said stack;
   means of obtaining a second computing power associated to said at least one client application;
   means of computing the sum of said first and second computing powers;
   means of comparing the sum of said first and second computing powers with a predetermined threshold;
   means of detecting that said second computing power is insufficient for said processor to execute said at least one client application; and
   means of restraining at least one functionality of said stack.

* * * * *

UNITED STATES PATENT AND TRADEMARK OFFICE
CERTIFICATE OF CORRECTION

PATENT NO. : 8,650,412 B2  
APPLICATION NO. : 12/669555  
DATED : February 11, 2014  
INVENTOR(S) : Girard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Twenty-ninth Day of September, 2015

Michelle K. Lee  
*Director of the United States Patent and Trademark Office*